Aug. 15, 1950　　K. H. MESCHWITZER　　2,518,561
APPARATUS FOR CONVERTING WHEELED VEHICLES INTO SLEDS
Filed Jan. 29, 1947　　3 Sheets-Sheet 1

INVENTOR.
KURT H. MESCHWITZER
BY
J. D. Douglass
HIS ATT'Y.

Aug. 15, 1950     K. H. MESCHWITZER     2,518,561
APPARATUS FOR CONVERTING WHEELED VEHICLES INTO SLEDS

Filed Jan. 29, 1947     3 Sheets-Sheet 2

INVENTOR.
KURT H. MESCHWITZER
BY
J. D. Douglass
HIS ATT'Y.

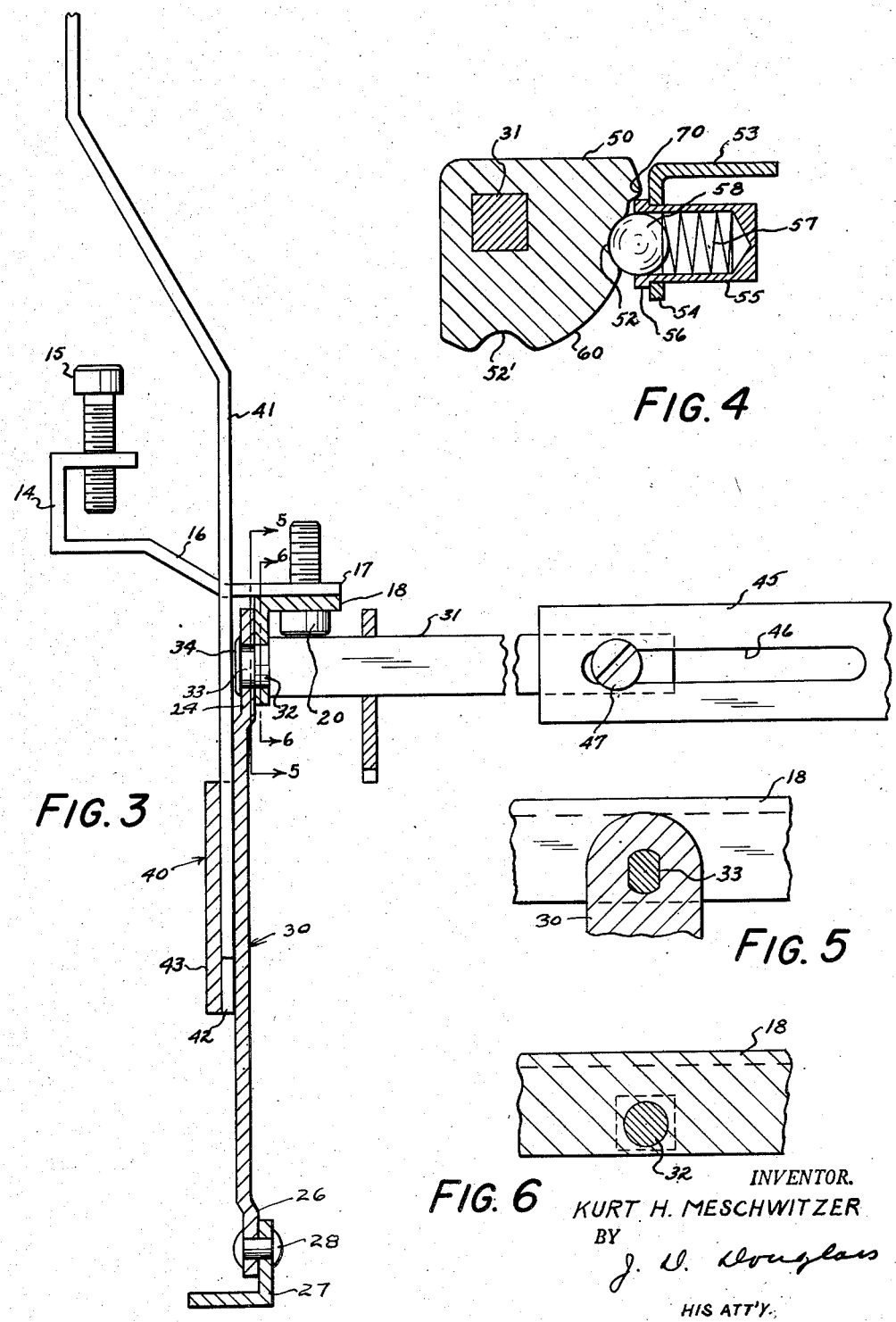

Patented Aug. 15, 1950

2,518,561

UNITED STATES PATENT OFFICE 2,518,561

APPARATUS FOR CONVERTING WHEELED VEHICLES INTO SLEDS

Kurt H. Meschwitzer, Lakewood, Ohio

Application January 29, 1947, Serial No. 725,088

3 Claims. (Cl. 280—11)

This invention relates to improvements in attachments for wheeled vehicles, such as baby buggies, child's wagons, or the like, whereby they may be readily converted into sleds for use on snow or ice.

Although, heretofore, devices have been proposed for converting wheeled vehicles into sleds, there have been many disadvantages in these prior devices which the present invention largely overcomes.

Not the least disadvantage of the prior devices was the fact that their construction was such that only a limited number of the many different buggy designs could be readily converted into sleds by a single attachment. Furthermore, the design of the prior attachments was such that they were too complicated for persons of limited skill in mechanics to effect their attachment. Still another disadvantage was that the prior devices were cumbersome and detracted from the aesthetic beauty of the vehicle to which they were attached. The operation of these prior devices was more or less uncertain as well as difficult. This was a particular disadvantage, since these devices are usually operated by women of limited strength. It very often happened that the runners would accidentally collapse, causing considerable jarring and sometimes injury to the occupant of the vehicle.

By my present invention, I have provided a system of sled runners which may be quickly and easily attached to a great variety of designs of wheeled vehicles. The attachment is extremely simple and may be accomplished by an unskilled person with a simple tool, such as a screw driver.

After the device is attached, it may be operated easily and quickly to convert the vehicle from a wheeled vehicle to one with sled runners, or vice versa, by simply shifting a single control lever. The operational limits of the device are determined by a spring lock mechanism which assures that the runners will remain in the place intended.

The device is useful, not only for converting a wheeled vehicle to a sled, but also as a positive brake for engagement with the dry ground which eliminates any possibility of the vehicle rolling from a "parked" position.

Still other advantages of the invention, and the invention itself, will become more apparent from the following description of an embodiment thereof, which description is illustrated by the accompanying drawings and form a part of this specification.

In the drawings:

Fig. 3 is an enlarged sectional view taken on the lines 3—3 of Fig. 2;

Fig. 4 is a sectional view taken on the line 4—4 of Fig. 2; and

Figure 1:
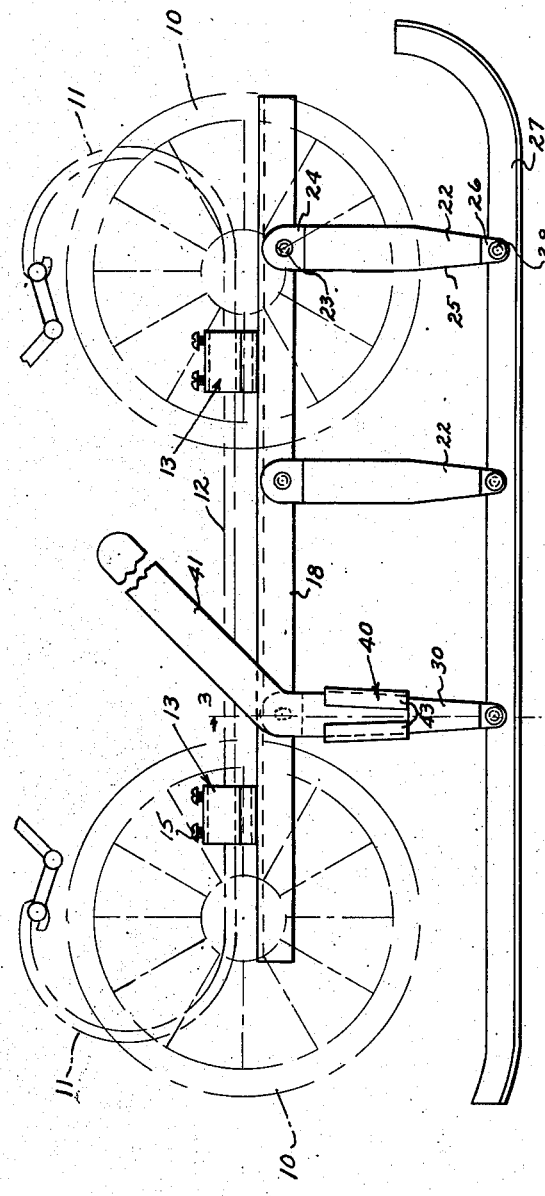
Fig. 1 is a side elevational view of my device showing certain parts of the vehicle in dash lines, and illustrating the runners in a lowered position.
Figure 2:
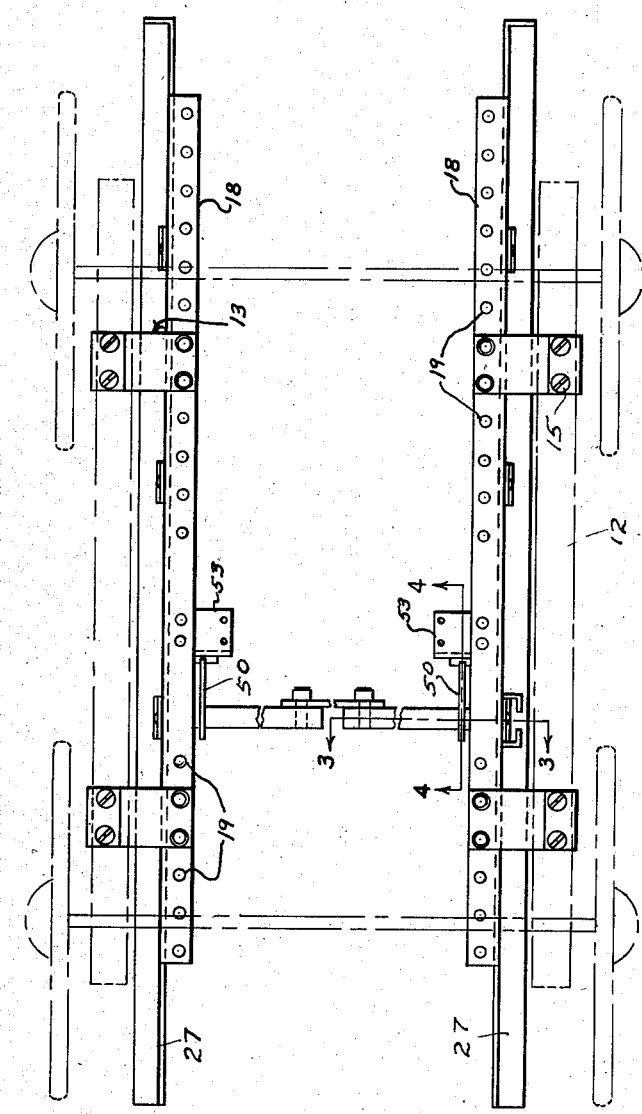
Fig. 2 is a plan view thereof.

Figs. 5 and 6 are sectional views taken on the lines 5—5 and 6—6, respectively, of Fig. 3.

Referring now to the drawings, throughout which like parts are designated by like reference characters, briefly, the invention contemplates a plurality of brackets which may be secured to the spring or vehicle frame and which adjustably supports a sub frame. The sub frame has members pivotally secured thereto which carry the runners. Some of these members on opposite sides are tied together, and at least one is provided with a handle by means of which the runners may be raised or lowered. Means is provided to hold the runners locked in an "up" or "down" position as desired.

More particularly, as can best be seen in Fig. 1, the wheels 10 of a vehicle are illustrated in dashed lines and are connected to spring frame members such as 11. In this case, the lower run 12 of the frame extends in a straight line between the wheel axles, not shown.

I provide four attaching brackets 13 adapted to be secured to the frame portion 12 and to support a sub-frame to which the runners are connected.

The brackets may be made of heavy guage sheet metal and include an upper supine U-shaped part 14, each having two screws 15 threaded through the upper leg and extending toward the lower leg. From the U part the bracket inclines downwardly at 16 and is provided with a flat longitudinally extending part 17 on its extremity.

Four of these brackets are provided, adapted to be attached to the frame or spring member 12 on opposite sides adjacent the front and rear axles. Preferably, they are attached so that the part 17 extends inwardly of the wheels.

Each runner, and its supporting sub frames and linkage, is preferably in assembled condition. Each includes a sub frame member 18, formed of angle stock, and provided with a plurality of longitudinally spaced holes 19 in the upper horizontally extending part. The purpose of the numerous holes is to provide a wide range of adjustment for attaching the brackets 13, the frames being secured to the brackets by screws 20 extending through the holes in the frame and threaded into the brackets.

The other portion of the angle frame extends downward vertically, and is disposed toward the wheels. At the front end of the frame members, links 22 are pivotally secured to the frame at 23. The upper end of each link is offset toward the frame, as indicated at 24, to provide a good bearing surface. The bottom end of the link is tapered at 25, and the bottom is offset at 26 and pivotally secured to the runners 27 by pivot pins 28. Centrally disposed links of the same construction are provided.

The rear links 30 are the control links. They are connected to the frame by a square stub shaft 31 having a reduced circular extension 32 rotatably journalled in the sub frame and provided with a squared extension 33 (Fig. 5) which is secured in a complementary hole in the link on the outside of the frame, the end of the shaft being headed over at 34 to hold the same rigidly to the link. In practice, I have found it desirable to weld the shaft 31 to the link 30.

The other end of the link 30 is secured to the runner 27 in the same manner as the other links.

One of the links 30, in this instance the one on the right side, is formed with a socket 40 for receiving the operating handle 41. The socket may be formed integral with the link and comprise outwardly bent lugs, or wings 42, which are then bent parallel to the body of the link, as at 43, and then may extend inward toward each other, terminating in spaced relation to each other as shown in the figures. Preferably, the side walls of the socket taper in the downward direction so that the end of the handle, which may also be tapered, may be wedged securely therein.

The square stub shafts comprise means whereby the two links 30, and hence the runners, are tied together so that they are raised or lowered in unison. To this end, a tie bar 45 is provided, made of a heavy flat strip, and formed with longitudinally extending slots 46. Screws 47 may be inserted through the slots and threaded into openings in the stub shaft 31. In this manner the two stub shafts may be locked together so that they operate in unison. The slotted bar 45 provides for a wide range of adjustments for vehicles having frames of varying widths.

Means is provided to retain the runners in a raised or lowered position and includes segments 50 secured to the stub shafts 31, the segments being provided with peripherally spaced notches 52 and 52'. Brackets 53 are secured to the sub frame 18, each comprising an angle member having a vertically extending part 54 which supports a housing 55. The housing has a flange 56 which engages with the part 54 and houses a spring 57 which presses a ball 58 into the notches 52 or 52'. The operation is similar to the conventional so-called "bullet catch." When the segment is rotated, the ball is forced out of the notch, rolls over the surface 60, and is eventually pressed into the other notch. In this manner, the stub shafts are restrained from movement in either of two limited positions.

When the links 30 are rotated to raise the runners, the notch 52' operates with the catch to hold the runners in their upper position.

When the runners are lowered, the notch 52 holds the runners in the lower portion. Further movement is prevented by the projection 70 on the segment 50 which engages with the flange of the catch.

Preferably, the device is shipped in a knocked down condition. That is, the separate runner assemblies are not connected together. Each assembly may be in its "up" or folded position. This enables the devices to be placed in a small compact package resulting in economies in shipment, packaging and storage.

The user first attaches the brackets 13 to the frame or spring of the vehicle. Next, he attaches the individual runner assemblies, after which the tie bar is secured in place. The handle may then be placed in the socket, and the device is ready for use.

On dry or iceless sidewalks the runners are disposed in the upward position where they are held by the catch. Should it be desired to park the vehicle, the runners may be lowered into connection with the dry ground, which raises the wheels off of the ground and assures that the vehicle will remain in position. The abutment of the projection 70 with the flange 56 of the housing 55 provides a positive lock which prevents the further movement of the segment 50 and thence the links and runners assuring that the runners will not accidentally "fold up" when the vehicle is in the parked position. They also assure that the folding up will not occur prematurely when the vehicle is being pushed, with the runners down, through soft snow.

It will be appreciated that when the shaft 31 is welded to the link 30, it may be unnecessary to square the shaft as indicated at 33, since the welding alone will hold the shaft and the link locked securely to each other.

When the ground is covered with snow or ice, the runners may be in their lowered position and raised when a dry spot is approached, this operation being performed quickly and easily by the operation of the vehicle.

The device, therefore, has an all year round use. It will be noted that the device is inconspicuous and does not detract from the appearance of the vehicle, the various components blending nicely into the vehicle's design.

Having thus described my invention in an embodiment thereof, I am aware that numerous and extensive departures may be made therefrom without departing from the spirit or scope of my invention.

I claim:

1. An apparatus of the class described including frames adapted to be attached to a wheeled vehicle, links pivotally secured to said frames and sled runners carried thereby, a tie bar connecting at least two of said links on opposite sides of the vehicle together to cause said links to operate in unison, handle means for rotating said links to raise or lower said sled runners, and cam means carried by the tie bar and spring detent means carried by the frame engageable with said cam to hold said tie bar in predetermined operated position.

2. An apparatus of the class described, comprising clamping members adapted to be secured to the frame or spring of a wheeled vehicle such as a buggy or the like, a sub frame adjustably supported by said clamping members, runner supporting members each having one end pivotally secured to said sub-frame and a runner pivotally connected to the other end, bracket means carried by at least one of said runner supporting members, a handle removably disposed in said bracket and forming an extension of at least one of said runner supporting members, tie means for tieing at least two of said runner supports on opposite sides of said frame together, including square shafts pivotally disposed in said sub frame and each having an extension secured in said runner supporting members, and a tie bar formed with longitudinally extending slots and screw means extending through said slots into said shafts for adjustably connecting said tie bar to said square shaft means, and means for holding the runners in alternate raised or lowered position comprising at least one segment carried by said square shaft and formed with spaced notches, a bracket on said frame and a catch supported in said bracket including a housing having a ball and a spring in the housing pressing said ball against the periphery of said segment.

3. An apparatus of the class described, comprising clamping members adapted to be secured to the frame or spring of a wheeled vehicle such as a buggy or the like, a sub frame adjustably supported by said clamping members, runner supporting members each having one end pivotally secured to said sub-frame and a runner pivotally connected to the other end, bracket means carried by at least one of said runner supporting members, and an operating handle removably disposed in said bracket, tie means, for tieing at least two of said runner supporting members on opposite sides of said frame together, including square shafts pivotally disposed in said sub frame and each having an end secured in one of said runner supporting members, a tie bar for adjustably connecting said shafts together, and means for holding the runners in alternate raised or lowered position comprising at least one segment carried by said square shaft and formed with spaced notches, a bracket on said frame and a catch supported in said bracket including a housing having a ball and a spring in the housing pressing said ball against the periphery of said segment, and a projection on said segment for engagement with said housing to afford a positive stop for the segment.

KURT H. MESCHWITZER.

REFERENCES CITED

The following references are of record in the file of this patent:

UNITED STATES PATENTS

| Number | Name | Date |
|---|---|---|
| 1,004,722 | Baldwin | Oct. 3, 1911 |
| 1,027,224 | Syverson | May 21, 1912 |
| 1,112,825 | Miele | Oct. 6, 1914 |
| 1,149,983 | Pedersen | Aug. 10, 1915 |
| 1,188,930 | Goudy | June 27, 1916 |
| 1,246,784 | Reynolds | Nov. 13, 1917 |
| 1,438,359 | Caron et al. | Dec. 12, 1922 |